United States Patent [19]
Johnson

[11] 3,839,191
[45] Oct. 1, 1974

[54] HYDROCRACKING OF COAL LIQUIDS

[75] Inventor: Cecil J. Johnson, Columbia City, Ind.

[73] Assignee: Total Energy Corporation, Columbia City, Ind.

[22] Filed: July 28, 1970

[21] Appl. No.: 64,095

Related U.S. Application Data

[63] Continuation of Ser. No. 810,258, March 25, 1969, abandoned.

[52] U.S. Cl. ................ 208/108, 208/8, 208/10, 208/166, 252/420
[51] Int. Cl. ..................... C10g 1/04, C10g 1/06
[58] Field of Search .............. 208/10, 108, 166, 8; 252/420

[56] References Cited
UNITED STATES PATENTS

| | | |
|---|---|---|
| 3,104,227 | 9/1963 | Pfeiffer et al. ............... 252/417 |
| 3,232,861 | 2/1966 | Gorin et al. ............... 208/10 |
| 3,505,206 | 4/1970 | Decker ............... 252/414 |
| 3,524,822 | 8/1970 | Frankovich et al. ............... 252/420 |
| 3,557,019 | 1/1971 | Van Driesen ............... 252/420 |
| 3,575,847 | 4/1971 | Sprow et al. ............... 208/10 |

*Primary Examiner*—Herbert Levine
*Attorney, Agent, or Firm*—Edward E. Dyson; John J. Byrne

[57] ABSTRACT

A method wherein a catalyst used in a continuous hydrocracking process is successively passed through primary and secondary reaction zones and is passed through a wash zone whereby the catalyst is washed with hot water to remove catalyst poisons collected in the reaction zones. The washed catalyst is then passed through a regeneration zone wherein adhered coke particles are burned off of the catalyst. The catalyst is then recirculated and again fed through the reaction zones.

5 Claims, 1 Drawing Figure

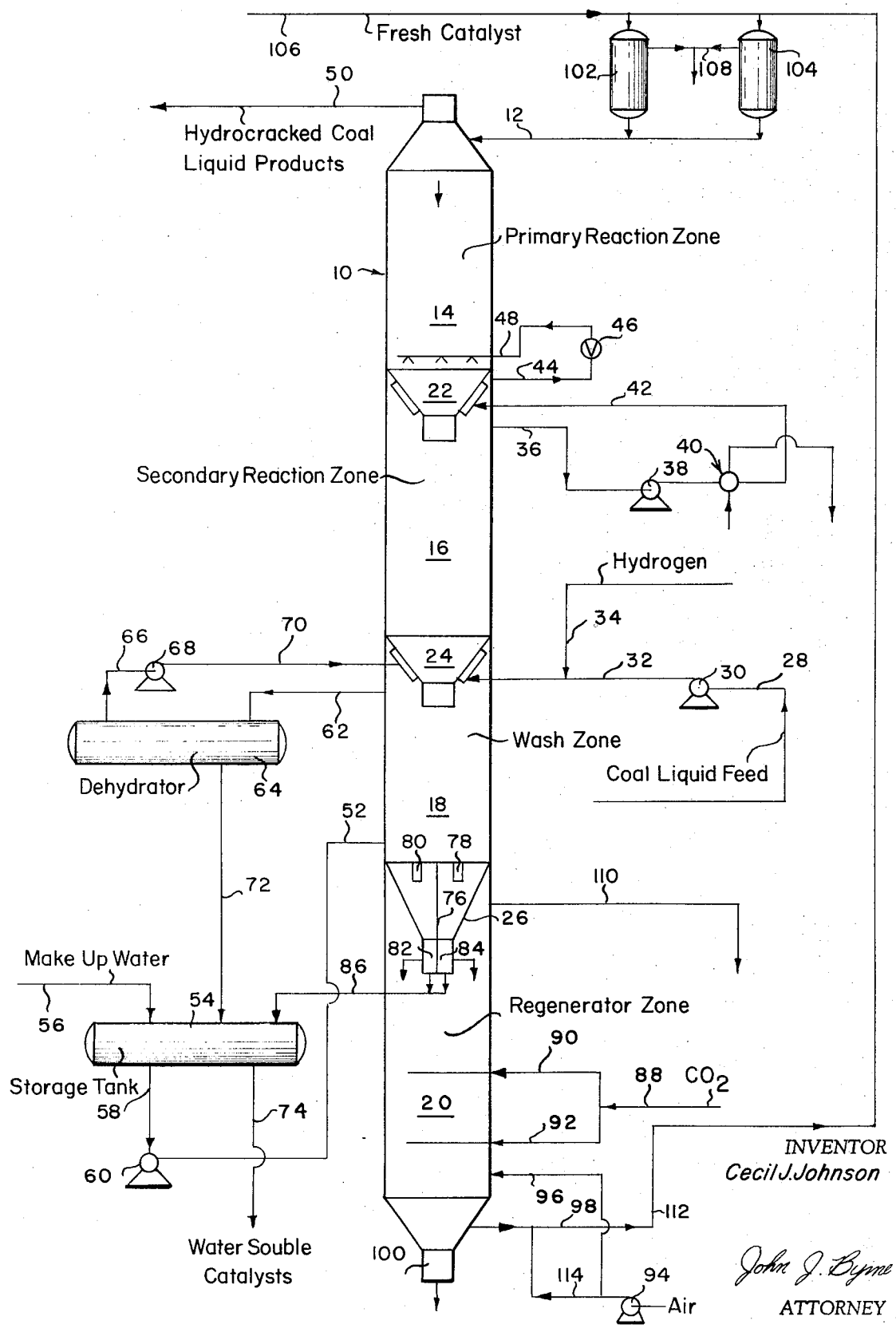

HYDROCRACKING OF COAL LIQUIDS

This application is a continuation of application Ser. No. 810,258, filed Mar. 25, 1969 now abandoned.

This invention relates to a method for catalytically processing coal liquids and/or more specifically this invention relates to an integrated method for continuously hydrocracking coal liquids or the like using an insoluble catalyst wherein hot water is used to wash the catalyst to remove catalyst poisons collected through contact with the coal liquids in a continuous hydrocracking process.

While it is known in the prior art that coal liquids and petroleum residuals contain relatively large amounts of catalyst poisoning compounds, the cost of removing such poisonous compounds prior to subjecting the coal liquids to the hydrocracking process is exorbitantly high. Further, another problem exists in that there is a tendency for the catalyst to collect coke particles which particles are difficult to remove. It is imperative that catalyst poisoning agents and coke particles be removed so that the catalyst may be reused in the process.

It is an object of the present invention to provide an integrated process for hydrocracking coal liquids and/or petroleum residuals to higher quality products in spite of the presence of catalyst poisoning agents in the coal liquids or petroleum residuals.

It is an object of this invention to provide a method wherein a spent catalyst can be washed and regenerated and recirculated continuously to provide a continuous hydrocracking process. In the prior art, the process is of the batch type wherein the catalyst is added and used and the hydrocracking system is then shut down while the catalyst is regenerated or new catalyst is added. In the method of this invention no 2CO. is required in the hydrocracking process.

It is a further object of the present invention to provide a system 2CO a hot wash of a spent catalyst removes catalyst poisoning agents and strips adhered coal liquid or petroleum residuals from the spent catalyst for purposes of being able to again subject the catalyst to the hydrocracking process without shutdown.

Another object of this invention is to provide a method wherein a continuously moving catalyst bed flows downwardly while the coal liquids and/or petroleum residuals and the added hydrogen gas flow upwardly countercurrent to the flow of the catalyst bed. In this manner, contact between hydrocarbons, hydrogen and the catalyst is maximized and caking, channeling and coking problems are minimized.

It is a further object of this invention to provide an integrated system wherein a catalyst bed continuously moves through reaction zones for hydrocracking purposes and then successively through a wash zone and a regeneration zone wherein coal liquid particles are washed off and coke particles are burned off respectively. The regenerated catalyst is then recirculated for reuse in the reaction zones.

Another object of the present invention is to provide a system wherein the temperature in the coke burn-off zone or the regeneration zone is controlled by injecting hot carbon dioxide gas into the zone. The carbon dioxide reacts endothermically with the carbon or coke on the catalyst to yield carbon monoxide which assists in controlling regenerator temperatures to avoid overheating the catalyst in the critical areas.

Specifically, this invention provides an integrated process for hydrocracking coal liquids and petroleum residuals comprising the steps of forming a continuously downwardly moving catalyst bed and creating a primary reaction zone, a secondary reaction zone, a wash zone and regeneration zone in tandem arrangement. The continuously moving catalyst bed flows successively through the four zones, coal liquids and/or petroleum residuals mixed with hydrogen gas are injected through the bottom of the second reaction zone under pressure such that they flow upwardly through the catalyst and countercurrent thereto and through said primary reaction zone. The hydrocracked coal liquids are then taken from the primary reaction zone. The catalyst continues through the wash zone wherein hot water is injected to wash the catalyst to take off the coal liquid and/or petroleum residuals carried by the catalyst bed from the primary and secondary zones. The catalyst bed then moves through the regeneration zone wherein hot carbon dioxide and air is injected to burn off any carbon particles adhered to the catalyst bed. The catalyst is then recirculated.

Further, means are provided for regulating the heat of the coal liquids and/or petroleum residuals being hydrocracked as the materials pass from the second reaction zone into the primary reaction zone.

Also, means are provided for taking off the wash water from the wash zone and separating out coal liquid or petroleum residuals and subjecting them again to the hydrocracking process.

These and other objects of the invention will become more apparent to those skilled in the art by reference to the following detailed description when viewed in light of the accompanying drawings wherein:

The drawing shows schematically the method of this invention.

Referring to the drawing, number 10 indicates a tower in which the method steps of this invention take place. A suitable catalyst is introduced into the top of the tower through line 12 and moves downwardly by gravity through the tower in the form of a continuously moving bed. Four zones are created in the tower through which the catalyst bed moves. A primary reaction zone 14, a secondary reaction zone 16, a wash zone 18 and a regeneration zone 20 are arranged in tandem relationship. The zones are separated by distributors 22, 24 and 26. Coal liquid and/or petroleum residuals are fed through line 28, pump 30 and line 32 to the distributor 24 at the bottom of the secondary reaction zone 16. Hydrogen is injected into line 32 through line 34. The pump provides sufficient pressure to force the liquids and hydrogen gas up through the secondary reaction zone 16 counter current to the downward flow of the continuously downwardly moving catalyst bed. The hydrocracking process takes place in the primary and secondary reaction zones in the presence of the moving bed of catalyst, the reaction being well known to those skilled in the art. The coal liquids and hydrogen gas reach the top of the second reaction zone 16 wherein the coal liquids are taken out through line 36 by means of pump 38. The liquid passes through a heat exchanger generally indicated by the numeral 40 and is then fed into distributor 22 through line 42, at the bottom of the primary reaction zone. The purpose of the heat exchange bypass is that catalytic reactions may be endothermic or exothermic and in order to properly control the heat of the reaction, the liquid should be subjected to either a heating or cooling step depending upon the particular situation as is well known in the art. The hydrogen gas is taken off the top of the secondary reaction zone by line 44 through valve 46 and fed into the bottom of the primary reaction zone via line 48. The hydrocracking process continues and liquids flow upwardly through the downwardly moving catalyst bed in the primary reaction zone 14. The hydrocracked liquids are taken off of the top of the tower by means of line 50.

The catalyst used in the secondary and primary reaction zones continues downwardly through distributors 22 and 24 and eventually into wash zone 18 where hot water is supplied at the bottom of the wash zone by means of line 52 for purposes of cleansing the catalyst which has picked up coal liquids or petroleum residuals in the hydrocracking process. In other words, poisons introduced to the catalyst by the coal liquids and/or petroleum residuals are removed. In prior art processes, it was necessary to treat the coal liquids and/or petroleum residuals prior to introducing them into the hydrocracking process, or, the poisons were not removed prior to the hydrocracking process and the process had to be shut down and the spent catalyst removed for reactivation. However, by this invention as is now being explained, it is unnecessary for the coal liquids and/or petroleum residuals to be processed prior to introduction to the system of for the system to be shut down. The catalyst is cleansed in an integrated hydrocracking and catalyst cleansing process. This furthers the life of the catalyst and keeps it more active since the amount of handling is minimized. Makeup fresh water is supplied to a storage tank 54 by means of line 56 wherein a suitable volume of water is kept for use in the wash zone 18. When necessary, water is taken off via line 58 and pump 60 and fed through the bottom of the wash zone by means of conduit 52. The stripped hydrocarbons and partially emulsified water flow to the top of the wash zone and then through line 62 to the dehydrator 64. In the dehydrator coal liquids and/or hydrocarbons are recovered and returned to the distributor 24 at the bottom of the secondary reaction zone through line 66, pump 68 and line 70. The coal liquids taken off are again subjected to the hydrocracking process. The recycled water returns to the storage tank 54 by means of line 72. More than likely, some soluble catalyst poisons will be included in the water returned to the storage tank 54 from the dehydrator. The storage tank is flushed periodically and these soluble poisons are taken from the tank by line 74 and disposed of. The water that was separated in the dehydrator is combined with the make up fresh water as introduced through line 56 and again returned to the bottom of the wash zone 18.

It is to be understood that the water in the wash zone 18 is under constant high pressure and forms a water lock whereby the hydrogen gas and the coal liquid, which is of lower specific gravity, introduced in the bottom of the secondary reaction zone 16 is prevented from flowing downwardly.

The distributor 26 is divided by a baffle 76 and alternate dump valves 78 and 80. The catalyst flows from the wash zone through the alternate valves 78, 80 and through the distributor 26 to the regenerator zone. During the process of discharging the catalyst through the alternate valves 78 and 80 some of the water from the water zone is also discharged. This water is collected in locked bins shown schematically at 82 and 84 and is taken off by line 86 and returned to the storage tank 54.

The catalyst entering the regenerator zone from the wash zone 18 is subjected to hot carbon dioxide introduced via lines 88, 90 and 92. Air is introduced by pump 94 through line 96. Sufficient heat may be supplied from an external source to support the reaction of the coke with the carbon dioxide to burn the coke off of the catalyst. The reaction is $CO_2 + C \rightarrow 2CO$. However, the heat of reaction of oxygen and carbon or oxygen and carbon monoxide may be used solely. Carbon dioxide is used as required to better control the temperature in the regenerator. The coke having been burned off in the regenerator, the catalyst is removed from the regenerator zone 20 by means of line 98 and is recirculated through an air lift 112 to be reused in the hydrocracking process. The pump 94 supplies sufficient pneumatic pressure for the air lift through line 114. A valve 100 is provided in the bottom of the tower to allow for emergency release of the catalyst bed if required. The combustion gases CO react with the air and form $CO_2$ which exits from the regeneration zone at 110. The reaction is $2CO + O_2 \rightarrow 2CO_2$. The exit gases can be expanded through a turbine or a rotary engine to provide the energy requirement to drive pump 94.

The recirculated and regenerated catalyst is fed to lock bins 102 and 104 wherein the regenerated catalyst is combined with fresh catalyst bed through lines 106. The lock bins are vented by vent means 108 shown schematically to remove excess air from the catalyst prior to its introduction to the top of the tower via line 12.

Reference is now made to the following examples each specifying the use of the same catalyst but the conditions under which the reactions occur vary in the different examples. The changes in yields are specified under the various conditions.

|  | Example 1 | Example 2 | Example 3 |
|---|---|---|---|
| catalyst used (active ingredient) | Moly-Ni Sulfide | Same | Same |
| catalyst circulation lbs./hr. | 0.5 | 0.5 | 0.5 |
| hydrogen circulation lbs./hr. | 0.3 | 0.4 | 0.5 |
| hydrocarbon recycle lbs./hr. | 0.6 | 0.6 | 0.5 |
| solvent in-feed lbs./hr. | 0.5 | 0.5 | 0.5 |
| coal extracted liquid lbs./hr. | 0.5 | 0.5 | 0.5 |
| Temperature — °F. | | | |
| primary reactor | 810 | 850 | 885 |
| secondary reactor | 845 | 875 | 900 |
| recycle reactor | 870 | 895 | 920 |

|  | Example 1 | Example 2 | Example 3 |
| --- | --- | --- | --- |
| catalyst regenerator | 1140 | 1170 | 1185 |
| Pressure — psig | | | |
| reactor | 1400 | 1500 | 2000 |
| regenerator | 25 | 30 | 35 |
| Yields weight per cent of raw coal | | | |
| gasoline (IBP to 350°F) | 15 | 10 | 12 |
| diesel fuel (325 to 600°F) | 29 | 34 | 32 |
| heavy diesel (550 to 1000°F) | 6 | 5 | 5 |

I claim:

1. A method for continuously hydrocracking coal liquids comprising the steps of forming a continuously downwardly moving catalyst bed, creating a primary reaction zone, a secondary reaction zone, a wash zone and a regeneration zone in tandem arrangement, passing said continuously moving catalyst bed through said primary and secondary zones, feeding coal liquids and hydrogen gas into the bottom of said second reaction zone and upwardly through and countercurrent to said catalyst bed and through said primary reaction zone, taking off hydrocracked coal liquids from said primary reaction zone, passing said catalyst bed through said wash zone, injecting hot water into said wash zone to wash said catalyst and to take off coal liquid carried by and adhered to said catalyst bed from said primary and secondary zones, passing said catalyst bed through said regeneration zone and burning off carbonaceous particles adhered to said catalyst.

2. The method of claim 1 wherein the coal liquids are subjected to a heat exchanger after leaving the secondary zone and before entering the primary zone to control the temperature of the liquids responsive to the temperature of the hydrocracking process.

3. The method of claim 1 wherein the hot water and coal liquid are taken from the wash zone after the catalyst is washed and is subjected to a separation process whereby coal liquids are separated from the water and reintroduced into the secondary reaction zone and the water is reintroduced to the wash zone.

4. The method of claim 1 wherein hot $CO_2$ is introduced into the regenerator zone to burn off carbon particles adhered to the catalyst and to form carbon monoxide by the reaction of $CO_2$ with carbon.

5. The method of claim 1 wherein the regenerated catalyst is recirculated and reintroduced successively to said zones for hydrocracking purposes.

* * * * *